June 22, 1954 F. E. SEEBURGER 2,681,813
HITCH FOR TRACTOR MOUNTED IMPLEMENTS
Filed May 29, 1950 2 Sheets-Sheet 1

Inventor
FREDERIC E. SEEBURGER.
By Emerson B Donnell
Attorney

June 22, 1954 — F. E. SEEBURGER — 2,681,813
HITCH FOR TRACTOR MOUNTED IMPLEMENTS
Filed May 29, 1950 — 2 Sheets-Sheet 2
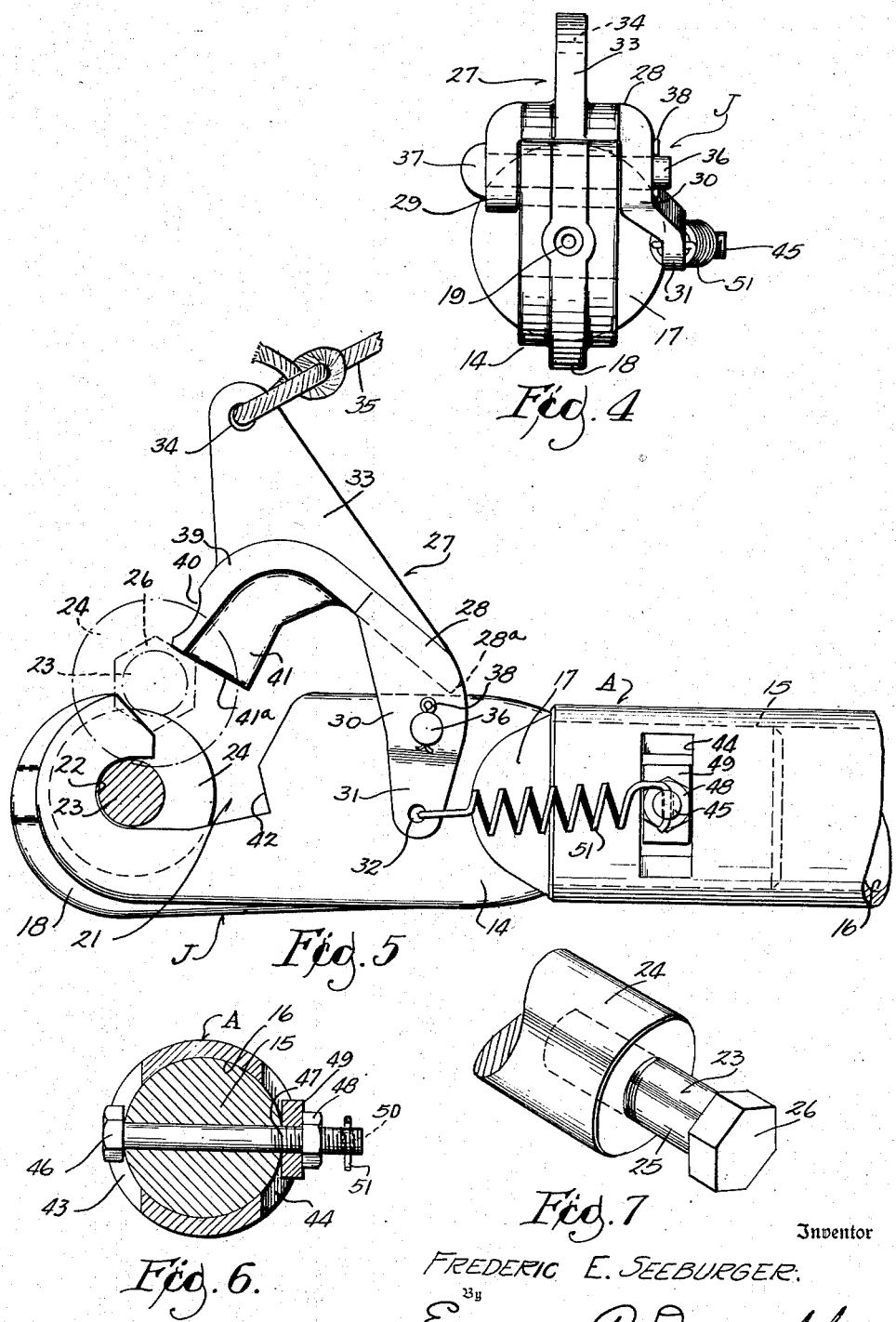
Inventor
FREDERIC E. SEEBURGER.
By Emerson B Donnell
Attorney Patented June 22, 1954

2,681,813

UNITED STATES PATENT OFFICE 2,681,813

HITCH FOR TRACTOR MOUNTED IMPLEMENTS

Frederic E. Seeburger, Coal Valley, Ill., assignor to J. I. Case Company, Racine, Wis., a corporation of Wisconsin Application May 29, 1950, Serial No. 164,970

10 Claims. (Cl. 280—456)

This invention relates to hitches for tractor-mounted implements and especially to a hitch jaw for conveniently connecting the implement to the hitch.

An object of this invention is to provide a hitch jaw which can be used to mount a variety of implements;

Another object is to provide a hitch jaw which will prevent inadvertent unhitching of the implement upon a forward shifting of the hitch pin;

Another object is to provide a hitch jaw having a latch which will not be lifted by sudden impact with the hitch pin;

Another object is to provide a hitch jaw having a latch which is adapted to be solidly supported against distortion under such sudden impacts;

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

In order to make the description clear, "forwardly" will signify in the direction of progress of the tractor and "rearwardly" in the direction opposite to such direction of progress, and "transversely" is understood to be any direction other than parallel to the above directions.

Referring to the drawings:

Fig. 4 is a rear view of the same looking forwardly toward the tractor;

Fig. 5 is an elevational view similar to Fig. 2 with the latch open, indicating a latch pin being inserted in the hitch;

Fig. 6 is a view of a section taken at 6—6 of Fig. 2.

Fig. 7 is a fragmentary view of the hitch pin and the means of attaching the implement thereto.

The tractor-mounted type of farm implement is becoming increasingly popular, because it can be raised from the ground and transported without requiring means of support other than the tractor on which it is mounted. Other reasons for the popularity of a tractor mounted implement are that it allows working closer to the corners of a field and that it has the ability to be backed up without "jackknifing" or doubling up at an angle to the tractor.

A tractor mounted implement usually requires a special form of hitch jaw which will enable an operator to release the implement without leaving his seat on the tractor. This latch jaw must be of a rugged construction in order to withstand the additional stresses imposed upon it when the implement is raised for transport, as well as those stresses induced when the implement is in working position.

Figure 1:
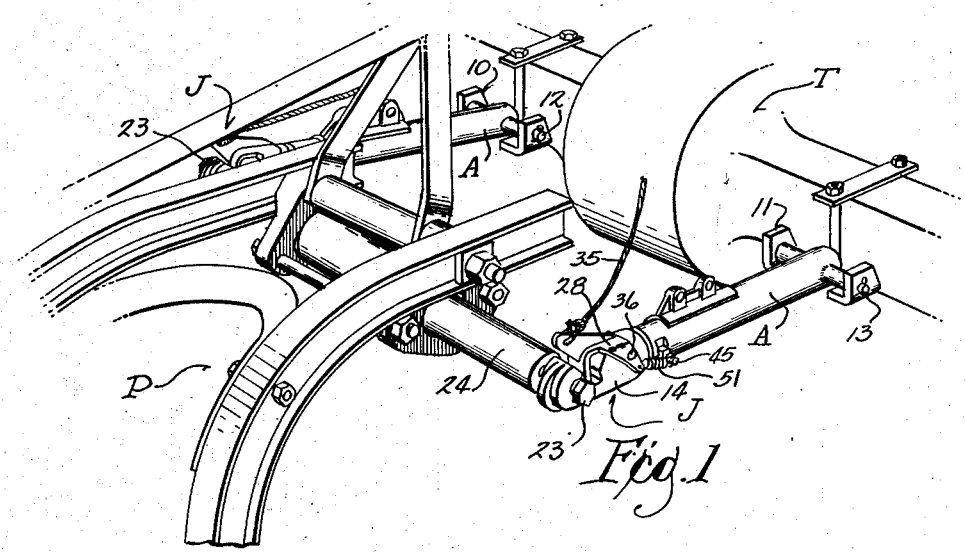
Fig. 1 is a fragmentary perspective view of a tractor implement hitch embracing this invention.

Fig. 1 shows a tractor T provided with rearwardly-extending hitch arms A, having mounted thereon a plow P. A pair of hitch jaws J are secured at the ends of arms A. As we are primarily concerned with the hitch jaws, the other details of mounting the implement to the tractor will not be described except when found necessary in order to clearly set forth the invention.

Hitch arms A are preferably of tubular construction and are supported in brackets 10 and 11. Pivot pins 12 and 13 provide pivotal support for arms A, allowing the latter to be raised or lowered in vertical planes.

Hitch jaws J are identical with the exception that one is preferably right-handed and the other left-handed; therefore only one will be described. The body 14 is preferably of steel and is of the shape shown. A shank 15 is machined to fit the bore 16 of arm A so that the shank is free to turn, and of a length sufficient to support the loads induced when transporting the implement to or from the field. The body 14 is shaped as shown and a reinforcement 17 is provided on each side between the body 14 and shank 15 for the purpose of strengthening the jaw J, and a rib 18 also serves to strengthen the hook portion of body 14. Center holes 19 and 20 are provided so that the jaw can be mounted upon centers when machining the shank 15. Body 14 extends rearwardly and is provided with a notch-like hook opening 21 which is open upwardly and forwardly. A recess or reentrant wall portion 22 is formed to receive a hitch pin or pintle 23 which will be described later.

Plow P is carried by a transverse pull bar 24 which is supported by hitch pins 23 at both ends thereof in jaws J. Bar 24 is so made as to allow side draft adjustment by rotation of the bar which detail is not part of this invention and need not be further considered except when necessary in describing the invention.

Hitch pin 23 provides the support of the plow relative to the arm A and is threadedly engaged in the end of pull bar 24 as shown in Fig. 7. The threaded hole in the pull bar 24 is preferably blind and hitch pin 23 in the present embodiment is turned to the bottom, leaving a sufficient length of shank 25 extending to freely accommodate the thickness of body 14 thereon. A head 26 is provided on pin 23 to prevent inadvertent displacement of jaw J from pin 23 and for other purposes.

A latch 27 serves to prevent displacement of the hitch pin 23 in a fore-and-aft direction from the recess 22. Latch 27 comprises an upper portion 28 provided with ears 29 and 30, ear 30 terminating in an extension or arm 31 having a hole 32. The purpose of hole 32 will be made clear later. Latch 27 has a rearwardly and upwardly extending portion or connection 33 provided with a hole 34. A rope or cable 35 is secured in hole 34 and extends to a point convenient to the tractor operator so that latch 27 can be operated without leaving the tractor seat.

Latch 27 is pivoted forwardly to body 14 at the point shown on a pin 36 having a head 37 pin 36 passing through ears 29 and 30 and body 14. A cotter 38 or similar fastening means prevents pin 36 from being axially displaced.

Figure 2:
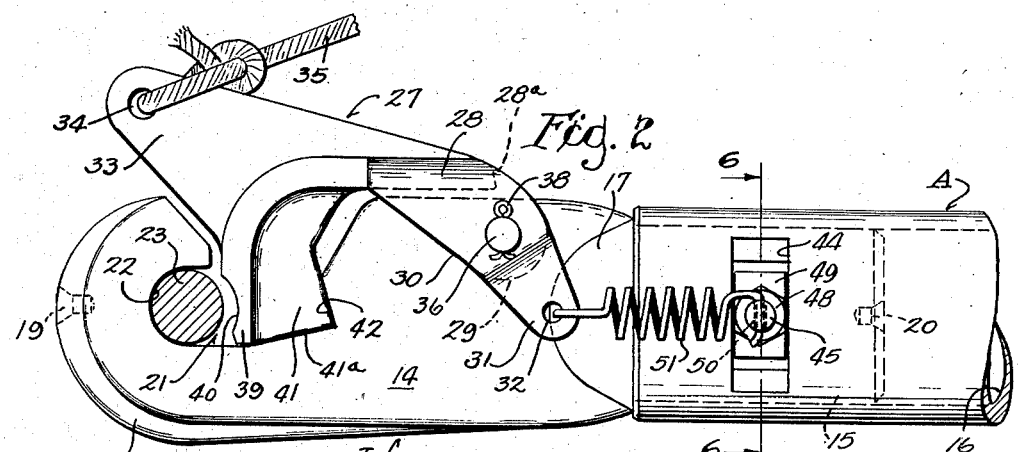
Fig. 2 is an enlarged right side elevational view of the hitch jaw embracing this invention.
Figure 3:
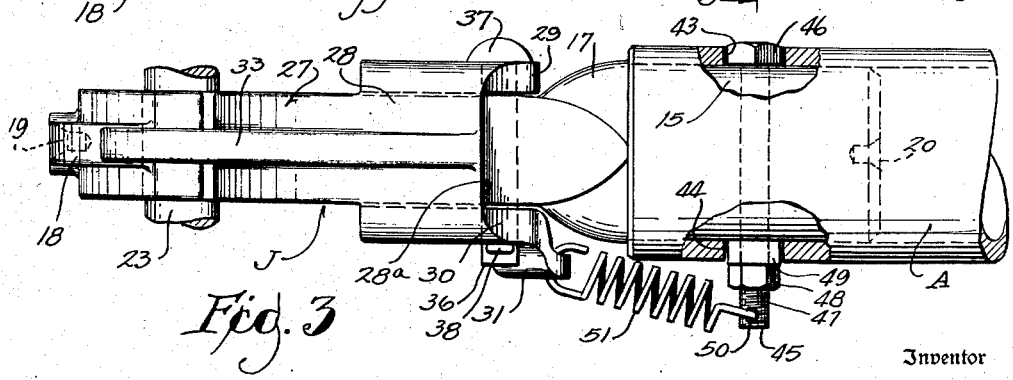
Fig. 3 is a plan view of the hitch jaw.

Latch 27 has a portion 39 which provides an abutment for hitch pin 23 as shown in Figs. 2 and 5. Portion 39 is provided in this instance with an arcuate groove 40 directioned transversely of the latch 27 and which groove forms a seat against which hitch pin 23 abuts when the latter is shifted forwardly in recess 22. A portion 41 forming part of latch 27 serves to provide a solid abutment for latch 27 against a complementary face 42 on body 14, to protect the latch from damage if a sudden force displaces hitch pin 23 toward the tractor, said complementary face 42 on body 14 forming an abutment for the portion 41 thereby absorbing the shock of sudden impacts so that neither latch 27 nor pin 36 will be bent or otherwise injured. Body 28 of latch 27 is provided with a stop 28ᵃ which contacts body 14 when rope 35 is pulled by the operator. Surface 41ᵃ is disposed at an angle such that hitch pin 23 will be biased downwardly into hook portions 21 upon backing the tractor with latch 27 in the position shown in Fig. 5.

Jaw J, as mentioned before, is adapted to rotate about a fore-and-aft axis in arm A to a limited extent. The purpose of this rotation is to allow vertical angular adjustment of arms A relative to each other. Such adjustment would be interfered with unless freedom of rotation of hitch jaws J were allowed.

Although freedom of rotation of jaws J is necessary, it should be limited in order that recesses 22 of the jaws of arms A—A are always positioned substantially so that hitch pins 23 will freely enter the recesses 22. In order to secure shanks 15 within arms A—A and to limit rotation of jaws J, slots 43 and 44 are cut in arms A preferably diametrically opposite each other as shown in Fig. 6, being of a sufficient vertical length to allow angular rotation of shank 15. Shank 15 has preferably diametrically therethrough, a bolt 45 having a head 46. Head 46 is of hexagonal shape in this instance and of a width to freely slide in slot 43. Portion 47 of bolt 45 is threaded to receive a nut 48. A key 49 of a width to freely slide in slot 44 has a hole to allow the key to be assembled on bolt 45 as shown in Fig. 6. After key 49 is assembled with bolt 45 and inserted in slot 44, nut 48 is threaded on bolt 45 and tightened. This arrangement, prevents the removal of shank 15 and allows the latter to freely rotate a limited amount.

Bolt 45 is provided with a hole 50 and a tension spring 51 is secured at its end in hole 32 of extension 31 and hole 50. The purpose of spring 51 is to maintain latch 27 in engagement with hook opening 21 against vibration which may dislodge it.

The operation of the device is thought to be clear from the description. However, it might be pointed out that the plow P is drawn through the arms A—A by means of the hitch pins or pintles 23 engaged with the hook-like surfaces 22 of the jaws J—J. If one of the arms A operates at a different elevation than the other for any reason, shanks 15 may shift or rotate slightly in arms A—A to align themselves with hitch pins 23. If for any reason, such as backing the tractor, extremely rough ground or the like, a reverse thrust is developed so that hitch pin 23 is forced against latch 27, it is received in recess or groove 40 and has no tendency to raise latch 27 out of notch-like opening 21. Such a force may be very substantial, perhaps in the form of an impact, and damage to latch 27 or pin 36 under these conditions is avoided by direct contact between portion 41 on the latch and abutment 42 on the solid portion of body 14.

When it is desired to connect the implement to the tractor, the implement will ordinarily be standing on the ground with hitch pins 23 extending in horizontal positions. Arms A—A are lowered by means not described since they form no part of the present invention, and the tractor is backed into position with jaws J—J lower than hitch pins 23—23. Ropes 35—35 are then pulled to position latches 27—27 in the relation indicated in Fig. 5. The tractor is then backed and the arms A—A adjusted until hitch pins 23—23 enter between bodies 14—14 and latches 27—27. Surfaces 41ᵃ—41ᵃ engage hitch pins 23—23 and tend to guide jaws J—J upwardly, and hitch pins 23—23 downwardly so that it is comparatively easy to position them in the notches 21—21. Arms A—A are then raised slightly and immediately when the tractor is driven forward hitch pins 23—23 shift into recesses 22—22 and latches 27—27 drop into place or into the position indicated in Figs. 1 and 2, when the hitch is complete so far as hitch pins 23—23 are concerned.

To release the implement, arms A—A are lowered until, with the implement resting on the ground, latches 27—27 are raised, the tractor backed slightly, arms A—A lowered slightly further and the tractor is driven away.

The above being a complete description of an illustrative embodiment of the invention, what is claimed as new and desired to be secured by Letters Patent of the United States is:

1. In a tractor having rearwardly-extending hitch arms for attaching an implement, said implement having transverse hitch pins, hitch jaws secured to the ends of said arms, each of said jaws swively associated with one of said arms about a fore-and-aft axis, and provided with a hook having a forwardly directed recess portion for engaging one of said hitch pins, said recess portion being of a depth in excess of the radius of the cross section of the hitch pin for preventing up and down movement of the hitch pin when engaged in said recess portion, a latch pivoted on said jaw forwardly of said hook and provided with a rearward surface forming an abutment extending into said hook portion and blocking the exit of said recess portion to retain said hitch pin in said hook against forward displacement thereof, said abutment being provided with a transverse groove positioned so as to engage said hitch pin upon forward impact of the latter with said abutment, the said impact being directed along a fore-and-aft axis passing beneath the axis of said latch pivot in order to bias said latch toward said hook and resilient means to bias said latch into engagement with said hook.

2. In a tractor having rearwardly-extending hitch arms for attaching an implement, said implement having transverse hitch pins, hitch jaws secured to the ends of said arms, each of said jaws swivelly associated with one of said arms about a fore-and-aft axis, and provided with a hook having a forwardly directed recess portion for engaging one of said hitch pins, said recess portion being of a depth in excess of the radius of the cross section of the hitch pin for preventing up and down rattling thereof when engaged in said recess portion, a latch pivoted on said jaw forwardly of said hook and provided with a rearward surface forming an abutment extending into said hook portion to block the exit of said recess portion and to retain said hitch pin in said hook against forward displacement thereof upon impact with said abutment, the said impact being directed along a fore-and-aft axis passing beneath the axis of said latch pivot in order to bias said latch toward said hook, and resilient means to bias said latch into engagement with said hook.

3. In a tractor having rearwardly extending hitch arms for attaching an implement, said implement having transverse hitch pins, hitch jaws secured to the ends of said arms each of said jaws swivelly associated with one of said arms about a fore-and-aft axis, and provided with a hook having a forwardly directed recess and a front upright wall portion, said recess engaging one of said hitch pins and being of a depth substantially equal to the radius of the cross section of the hitch pin, a latch pivoted on said jaw provided with a rearward surface forming an abutment extending into said hook portion so as to block the exit of said recess portion and to retain said hitch pin in said hook against forward displacement thereof upon impact with said abutment and a portion on said latch lying substantially in contact with said front upright wall when said latch is in said hook portion whereby to support said latch against distortion in the event of backward thrust in said drawbar, and resilient means to bias said latch into engagement with said hook.

4. In a tractor hitch, a hitch jaw mounted to swivel about a fore-and-aft axis and having a hook provided with a forwardly directed recess portion for engaging a transverse hitch pin of an implement in said recess portion, said recess portion being of a depth in excess of the radius of the cross section of the hitch pin for preventing up-and-down rattling of the hitch pin therein, a latch pivoted on said jaw forwardly of said hook and provided with an abutment adjacent the rearward surface thereof extending into said hook for blocking the exit of said recess portion to retain said hitch pin in said hook against forward displacement thereof, said abutment being provided with a transverse groove positioned so as to engage said hitch pin upon forward impact of the latter with said abutment, the said impact being directed along a fore-and-aft axis passing beneath the axis of said latch pivot in order to bias said latch toward engagement with said hook, and resilient means to bias said latch into engagement with said hook.

5. In a tractor hitch, a hitch jaw mounted to swivel about a fore-and-aft axis and having a hook provided with a forwardly directed recess portion for engaging a transverse hitch pin of an implement therein, said recess portion being of a depth in excess of the radius of the cross section of said hitch pin for preventing up-and-down rattling of the hitch pin therein when said hitch pin is operatively received therein, a latch pivoted on said jaw forwardly of said hook and provided with a rearward surface forming an abutment extending into said hook to block the exit of said recess portion and to retain said hitch pin therein against forward displacement of said pin upon impact with said abutment, the said impact being directed along a fore-and-aft axis passing beneath the axis of said latch pivot in order to bias said latch toward said hook, and resilient means to bias said latch into engagement with said hook.

6. A hitch jaw for engagement with the transverse hitch pin of an implement comprising a hook having a forwardly directed recess portion, said recess portion being of a depth substantially equal to the radius of the cross section of said hitch pin for receiving said hitch pin, said recess portion preventing up-and-down movement of the hitch pin therein when the pin is operatively received therein, a latch pivoted on said jaw at a point spaced from said hook portion and provided with a rearward surface forming an abutment extending into said hook to block the exit of said recess portion and to retain said hitch pin in said hook against forces tending to displace said pin therefrom, said abutment being provided with a transverse groove positioned so as to engage said hitch pin upon forward impact of the latter with said abutment, the said impact being directed along an axis passing without the axis of said latch pivot in order to bias said latch toward engagement with said hook, and resilient means to bias said latch into engagement with said hook.

7. In a hitch for use with a tractor having a rearwardly extending hollow drawbar pivoted for up and down swinging movement, said hitch comprising a shank portion journaled for rotative movement in the rear end of said hollow drawbar, said drawbar providing opposed slotted holes extending for a limited distance circumferentially of said drawbar, a pin traversing said shank and extending into said slotted holes to prevent withdrawal of said shank while providing freedom for tilting of said shank therein, a body portion providing an upwardly directed notch-like opening having a front upright wall portion and a rear reentrant wall portion forming a hook-like pintle-retaining recess, a latch element having a pivotal connection on said body portion forwardly of said notch-like opening, extending over said body portion and having a portion extending downwardly into said notch-like opening, said latch having a hollow seat opposed, when said latch is within said notch-like opening, to said reentrant wall portion, said latch being swingable about its pivotal connection into and out of said notch-like opening, a portion on said latch lying in contacting relation with said upright wall portion when said latch element is in position in said notch-like opening, whereby to support said latch against distortion in the event of backward thrust in said drawbar, an arm on said latch extending downwardly from said pivotal connection, a tension spring engaged with the arm and with said pin for yieldingly holding said latch in said notch-like opening, and a connection for shifting said latch out of said notch-like opening in opposition to said spring and into pintle receiving and releasing position.

8. In a hitch for use with a tractor having a rearwardly extending drawbar, said hitch including a body portion providing an upwardly directed notch-like opening having a front upright wall portion and a rear reentrant wall portion forming a hook-like pintle-retaining recess, a latch element having a pivotal connection on said body portion forwardly of said notch-like opening, extending over said body portion and having a portion extending downwardly into the rearward surface of said notch-like opening, said latch having a hollow seat opposed, when said latch is within said notch-like opening, to said reentrant wall portion for blocking the exit of said reentrant wall portion, said latch being swingable about its pivotal connection into and out of said notch-like opening, an upright abutment portion on said latch lying in contacting relation with said upright wall portion opposed to said reentrant wall portion when said latch element is in position in said notch-like opening for transmitting the shock imposed upon said latch element to said body portion instead of to the pivotal connection of the latch element in the event of backward thrust in said drawbar, whereby to support said latch against distortion in the event of backward thrust in said drawbar, a spring engaged with said latch for yieldingly holding said latch in said notch-like opening, and means for shifting said latch out of said notch-like opening in opposition to said spring and into pintle receiving and releasing position.

9. In a hitch for use with a tractor having a rearwardly extending hollow drawbar, said hitch including a shank portion journaled for rotative movement in the rear end of said hollow drawbar, said drawbar providing opposed slotted holes extending for a limited distance circumferentially of said drawbar, a pin traversing said shank and extending into said slotted holes to prevent withdrawal of said shank while providing freedom for tilting of said shank therein, a body portion providing an upwardly directed notch-like opening having a rear reentrant wall portion forming a hook-like pintle-retaining recess, a latch element having a pivotal connection on said body portion forwardly of said notch-like opening, extending over said body portion and having a portion extending downwardly into said notch-like opening, said latch being swingable about its pivotal connection into and out of said notch-like opening, a spring engaged with the latch for yieldingly holding said latch in said notch-like opening, and means for shifting said latch out of said notch-like opening in opposition to said spring and into pintle receiving and releasing position.

10. In a hitch for use with a tractor having a rearwardly extending drawbar, said hitch including a body portion on said drawbar providing an upwardly directed notch-like opening having a front upright wall portion and a rear reentrant wall portion forming a hook-like pintle-retaining recess, a latch element having a pivotal connection on said body portion forwardly of said notch-like opening, extending over said body portion and having a portion extending downwardly into said notch-like opening for blocking the exit of the pintle-retaining recess, and being swingable about its pivotal connection into and out of said notch-like opening, an upright abutment portion on said latch lying in contacting relation with said upright wall portion opposed to said rear reentrant wall portion when said latch element is in position in said notch-like opening, whereby to support said latch against distortion in the event of backward thrust in said drawbar by transmitting the shock of said backward thrust in said drawbar to said body portion instead of to the pivotal connection of said latch element, a spring engaged with said latch for yieldingly holding said latch in said notch-like opening, and means for shifting said latch out of said notch-like opening in opposition to said spring and into pintle receiving and releasing position.

References Cited in the file of this patent

UNITED STATES PATENTS

| Number | Name | Date |
|---|---|---|
| 1,287,459 | Schroeder | Dec. 10, 1918 |
| 1,832,042 | Mohr | Nov. 17, 1931 |
| 1,860,973 | Yeakel | May 31, 1932 |
| 1,870,606 | Contos | Aug. 9, 1932 |
| 2,239,320 | Haniquet | Apr. 22, 1941 |
| 2,375,970 | Williams | May 15, 1945 |
| 2,401,183 | Pool et al. | May 28, 1946 |

FOREIGN PATENTS

| Number | Country | Date |
|---|---|---|
| 114,832 | Australia | Mar. 19, 1942 |